United States Patent [19]

Sorensen et al.

[11] Patent Number: 5,067,396
[45] Date of Patent: Nov. 26, 1991

[54] COOKING DEVICE WITH HEAT FUNNEL

[76] Inventors: Dent G. Sorensen, 80 N. 3rd East, Salina, Utah 84654; Newell J. Hatch, Aurora, Utah 84620

[21] Appl. No.: 514,407

[22] Filed: Apr. 23, 1990

Related U.S. Application Data

[63] Continuation-in-part of Ser. No. 389,731, Aug. 4, 1989, abandoned.

[51] Int. Cl.$^5$ .............................................. A47J 27/12
[52] U.S. Cl. .................................... 99/340; 99/422; 99/447; 99/449; 126/9 R; 126/9 B; 220/23.86; 220/912
[58] Field of Search .......... 99/340, 422, 426, 447–450, 99/482; 126/9 R, 9 B, 369; 16/126, 110 A; D7/354, 356, 360, 363, 409; 220/23.83, 23.86, 912, 94 B, 95

[56] References Cited

U.S. PATENT DOCUMENTS

| | | | |
|---|---|---|---|
| D. 277,357 | 1/1985 | Levine | D7/356 |
| 4,619 | 10/1871 | Lee | 99/340 |
| 77,884 | 5/1868 | Isham | 99/422 |
| 127,900 | 6/1872 | Lee | 99/422 |
| 191,703 | 6/1877 | Milligan | 99/422 |
| 520,470 | 5/1897 | Yinger | 126/369 |
| 590,212 | 9/1897 | Daesch | 99/448 |
| 1,126,658 | 1/1915 | Roughton | 16/126 |
| 1,246,622 | 11/1917 | Lightfoot | 99/422 |
| 2,174,824 | 10/1939 | Frank | 220/95 |
| 2,501,572 | 3/1950 | Marquez | 220/912 |
| 2,565,046 | 8/1951 | Rooth | 99/426 |
| 4,332,188 | 6/1982 | Rhear | 99/447 |

FOREIGN PATENT DOCUMENTS

| | | | |
|---|---|---|---|
| 70051 | 10/1949 | Denmark | 99/447 |
| 537638 | 10/1931 | Fed. Rep. of Germany | 99/447 |
| 683116 | 10/1939 | Fed. Rep. of Germany | 99/448 |
| 2734246 | 2/1978 | Fed. Rep. of Germany | 99/447 |
| 712702 | 10/1931 | France | 99/449 |
| 1199494 | 12/1959 | France | 126/369 |
| 560937 | 4/1957 | Italy | 99/447 |
| 7903034 | 10/1980 | Netherlands | 99/447 |
| 225971 | 5/1943 | Switzerland | 99/447 |
| 5284 | of 1901 | United Kingdom | 16/126 |
| 238 | of 1912 | United Kingdom | 99/450 |

Primary Examiner—Harvey C. Hornsby
Assistant Examiner—Mark Spisich
Attorney, Agent, or Firm—Terry M. Crellin

[57] ABSTRACT

A cooking device including a deep pan having a funnel located centrally in the bottom thereof through which heat may rise and circulate in the interior areas of the pan. The pan may also include a griddle which acts as a cover, the heat funnel being adjacent the bottom surface of the griddle when the griddle is covering the pan. Heat may channel from the heat source through the heat funnel to evenly heat the bottom of the griddle as it evenly heats the interior of the pan. The invention also includes a novel handle arrangement on the griddle and pan. The handles are lockable in their upright position if desired in order to stabilize and prevent rotation of the griddle or pan when being lifted. A heat cone may also be placed over the heat funnel to somewhat insulate food inside the pan from direct contact with the heat funnel. A cover which will fit over the entire griddle surface, or alternatively, directly over the pan itself, is also included.

8 Claims, 4 Drawing Sheets

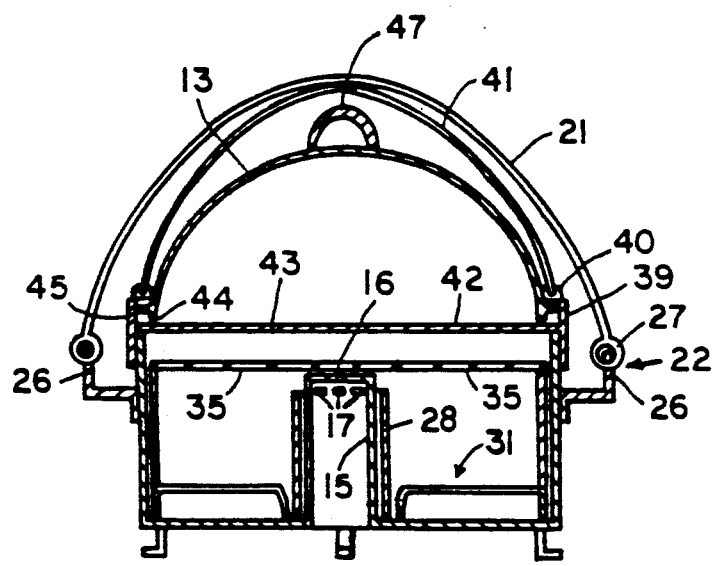
FIG. 3
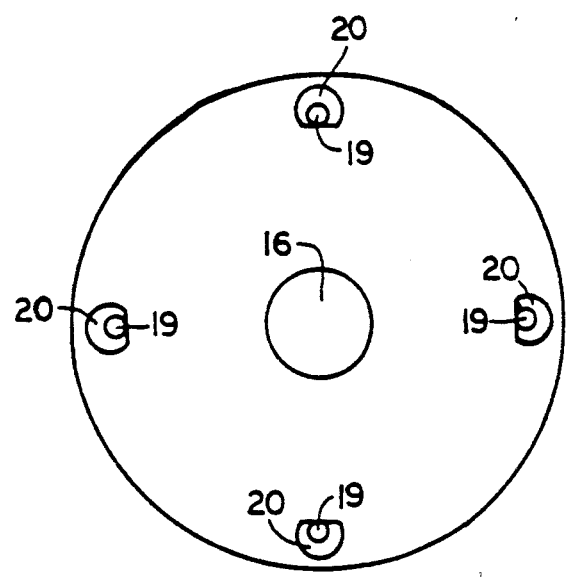
FIG. 6
FIG. 5
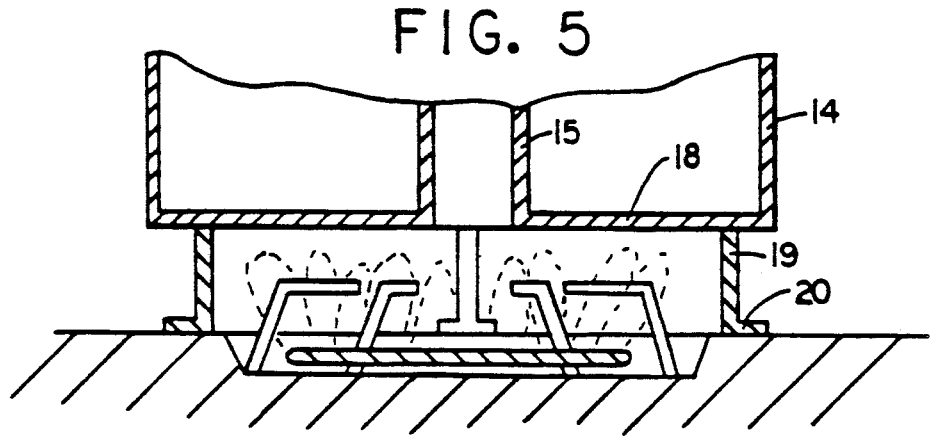

COOKING DEVICE WITH HEAT FUNNEL

This application is a continuation in part of U.S. Pat. Application Ser. No. 07/389,731 to Sorensen entitled "Wheel Kooker," filed Aug. 4, 1989, abandoned.

BACKGROUND OF THE INVENTION

1) Field of the Invention

This invention relates to cooking devices. More specifically, the present invention relates to improvements in pans and griddles used separately or in combination to improve the heating characteristics and versatility of use thereof.

2) Background of the Invention

Many utensils and other devices have been developed in the past in order to improve the user's ability to prepare food. More specifically, many utensils designed specifically for the heating of food under desired conditions in order to have the heated food result in a desired food product, have also been developed. A particular device which has been found useful for such purposes over the past several hundred years is the Dutch oven.

The Dutch oven generally consists of a deep dish pan, usually formed of cast iron, and a tight, usually cast iron, cover therefor. The pan usually includes legs on the bottom surface thereof in order that it may be easily placed over coals of a fire or the like, and a semi-circular handle to facilitate its placement and removal therefrom. The lid is usually slightly concave and has a small rim which encircles the entire perimeter thereof and a small loop-type handle in its center. The rim of the lid is intended make possible the addition of hot coals or the like to the top of the lid if it is desired to more uniformly heat the food located in the oven.

Although the Dutch oven is very useful in preparing food in the coals of a fire, it becomes less useful when used in conjunction with more modern types of heat sources commonly used in cooking food. For example, the Dutch oven yields less than favorable results when heated by an electric plate or gas type stove. The design of such stoves makes it impossible to uniformly heat the interior of the Dutch oven as per the Dutch oven's original design.

There have been recent attempts to modify the traditional Dutch oven in order to improve its heating characteristics when used with more modern or convenient heat sources. Such prior art modifications to a Dutch oven generally include design changes to the bottom thereof which allow heat to circulate within the interior of the Dutch oven in a more efficient manner. An example of such prior art devices is shown in U.S. Pat. No. 77,884 to Isham.

The device shown by Isham is designed to be placeable on the top of a stove and has a removable bottom to regulate the heat. Also, perforated disks at various heights above the bottom of the oven allow heat to pass into the cooking area and circulate therein.

Other examples of cooking devices having heatcirculating bottoms specifically designed for heat flow into the interior cooking area thereof are shown in Danish Patent No. 57723 to Fabrik, Netherlands Patent No. 7903034 to Schawalder, Danish Patent No. 70051 to Grosserer, German Patent No. 537638 to Albrecht, and Italian Patent No. 560937 to Buracchio. Each of these patents shows a modification to the bottom of a Dutch oven type cooking device in order to allow heat to circulate from the bottom thereof into the interior cooking area in order to more evenly cook food therein.

Each of these devices, however, has been less than satisfactory in its design and performance characteristics. Specifically, each of these prior art devices is extraordinarily complicated in its design, making manufacture thereof difficult and expensive. Also, the prior art designs have been less than satisfactory in their ability to properly circulate the correct amount of heat, so as to evenly distribute heat into the interior of the pan for cooking the food. Further, none of these prior art devices addresses the unique combination of the present invention wherein a deep pan may be used to evenly heat and cook food while at the same time a griddle may be used as a pan lid and also be evenly heated by the unique shape of the pan bottom so that the griddle may be used to heat or cook food thereon while food is being heated or cooked in the pan itself.

Further, prior art devices such as described above have been relatively difficult to maneuver by means of the prior art handles used therewith. The present invention solves this problem also by providing a unique combination of handles which allows for stability in manipulating the griddle so as to prevent an uneven distribution of food from causing the griddle to tip sideways when being removed from the pan. Further, the handles of the present invention can be attached to the pan and griddle by locking devices which allow the handles to be rotated when not in use but cause the handle to lock in its upright position when in use to prevent relative rotation of the handle and the pan or griddle to prevent spilling of the contents when the device is lifted.

SUMMARY OF THE INVENTION

It is an object of the present invention to provide a heating utensil which will evenly heat the interior thereof for evenly heating and/or cooking food therein.

It is another object of the present invention to provide a combination of utensils such as a pan and griddle which may be used separately or together in order to prepare food.

It is another object of the present invention to provide a pan which is capable of uniformly heating the interior thereof and also capable of uniformly heating a griddle placed thereover.

It is another object of the present invention to provide a unique handle system for a cooking utensil which prevents accidental spillage of food located thereon due to accidental tippage of the device when lifted.

It is further an object of the present invention to provide a handle system which allows the handles of a pan and griddle to be used in conjunction in lifting.

It is still another object of the present invention to provide a locking attachment for a handle used on a cooking utensil.

These and other objects of the present invention are included in the embodiment of a cooking device described herein which provides for uniform heating of food located in the interior of a pan thereof. The pan includes a generally cylindrically shaped housing having a bottom located on one end thereof which includes a cylindrically shaped heat cone extending from the central area of the bottom plate into the interior of the pan. The heat cone includes a top plate which closes its interior opening, and a series of holes or slots uniformly located around the circumference of the heat cone just below the top plate. The pan further includes a handle rotatably mounted at two opposing locations on the exterior cylindrical surface of its housing, which is capable of being locked into a position above the pan when being used for lifting and/or moving the pan, the lock preventing rotation of the handle relative to the pan while in the locked position. The device further includes a griddle which is generally circular in shape and which covers the top opening of the pan, the griddle being heated on the bottom surface thereof in a uniform manner by the heat cone located in the pan. The griddle includes a pair of handles, each handle attached at two positions around the perimeter of the pan and functioning together to allow a user to hold both handles at the same time when lifting the griddle in order to prevent relative rotation between the handles and the griddle when the griddle is being lifted. The device further includes a cover which will cover the entire surface of the griddle or alternatively will seal against the entire perimeter of the open top of the pan.

BRIEF DESCRIPTION OF THE DRAWINGS

FIG. 3 is a cross-sectional view of the cooking device incorporating the concepts of the present invention taken along line III—III of FIG. 2;

FIG. 5 is a partial cross-sectional view showing the bottom portion of the pan of the present invention placed over a gas burner unit;

FIG. 6 shows a bottom view of the pan portion of the present invention;

DETAILED DESCRIPTION OF THE INVENTION

Figure 1:
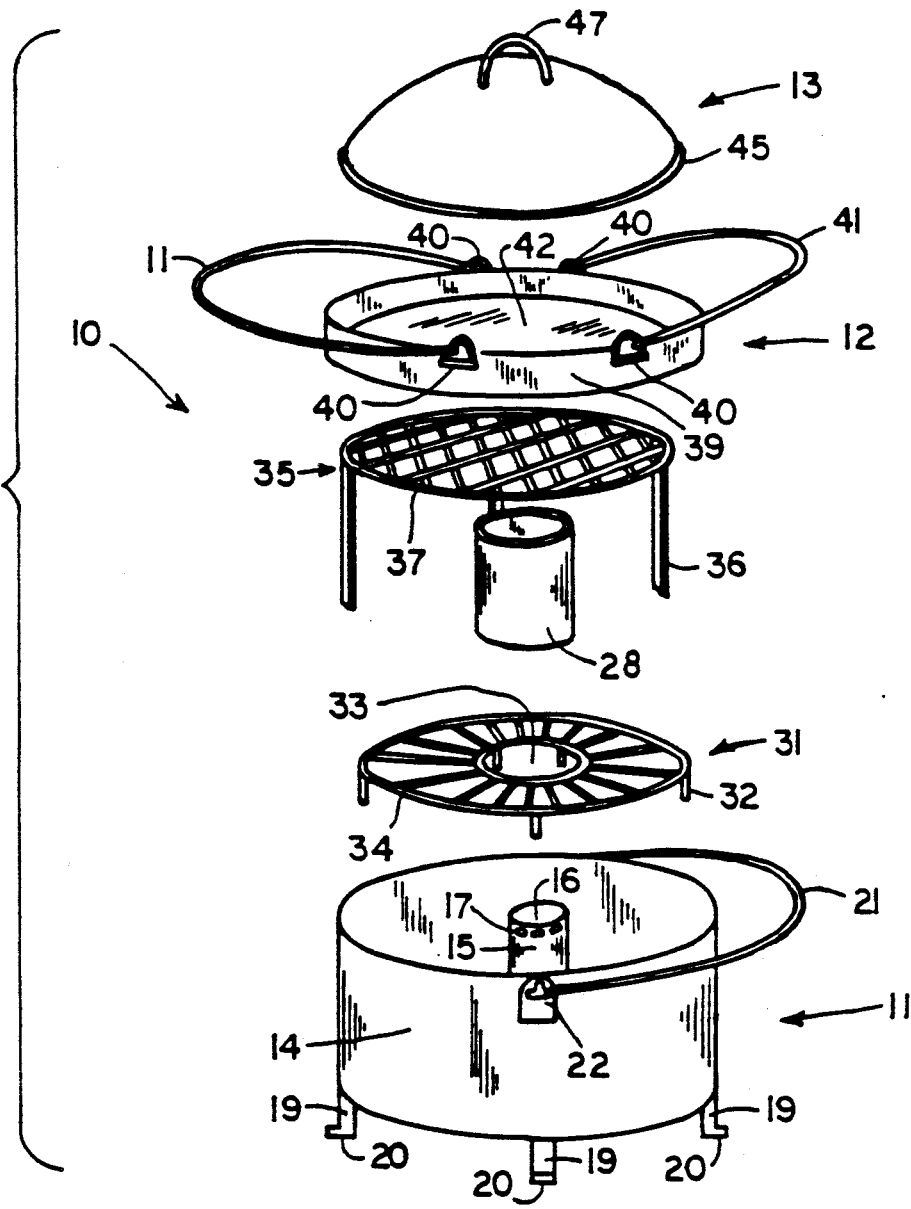
FIG. 1 is an expanded perspective view of the cooking device incorporating the concepts of the present invention.

FIG. 1 shows an expanded perspective view of the cooking device 10 of the present invention. The main elements of the invention being a pan 11 which is similar to the pan of a Dutch oven, however extensively modified according to the principles of the present invention; a griddle 12 sized to fit over the pan 11, and a cover 13 sized to fit onto the griddle 12 or alternatively over the opening of the pan 11. The pan 11, griddle 12, and cover 13 each having handles which are uniquely designed and located as per principles of the present invention as will be discussed below.

Figure 2:
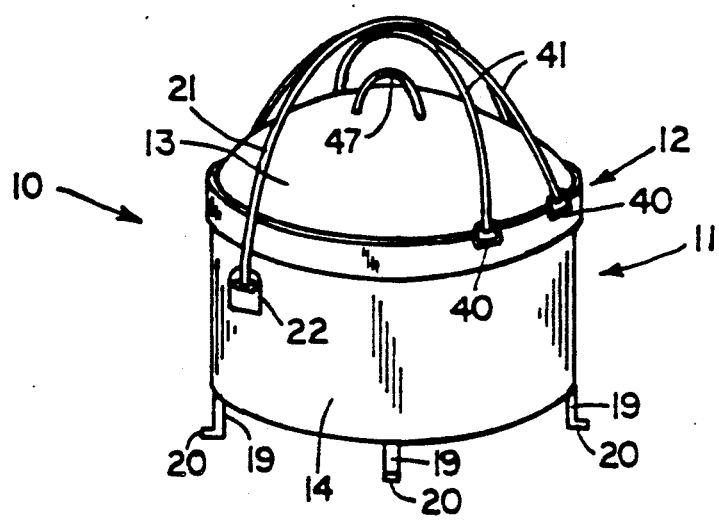
FIG. 2 is a perspective view of the cooking device according to the concepts of the present invention.

As best seen in FIGS. 1—3, the pan 11 of the present invention is preferably formed of metal such as cast iron, and includes a housing 14 which is generally cylindrical in shape having a depth of approximately 4 to 8 inches and a diameter of approximately 6 to 18 inches, the depth and diameter intending to be compensurate with standard depths and diameters of other pans such as pans for Dutch ovens. The cylindrical housing 14 includes a bottom 18 of annular shape located at one end thereof, and is open at its opposite end.

At the inner annular opening of bottom 18 is connected a heat funnel 15 which is generally cylindrical in shape and which extends into the interior of the pan 11 at the center thereof. The heat funnel 15 extends from the bottom 18 to just below the top opening of the pan 11. The heat funnel 15 includes a top cover 16, and a plurality of openings 17 located slightly below top cover 16 around the entire perimeter of the cylindrical portion of the heat funnel 15.

Figure 4:
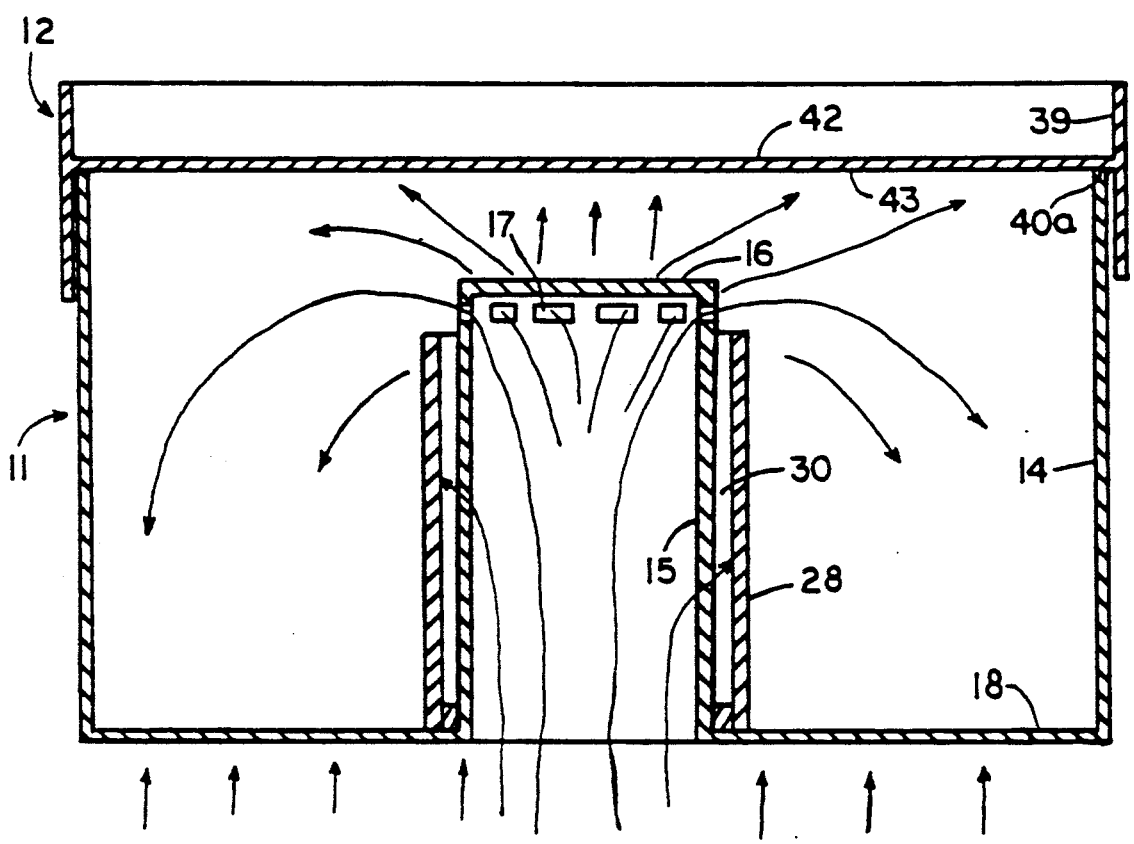
FIG. 4 is a cross-sectional view of the pan and griddle portions of the cooking device of the present invention showing heat circulation patterns in the interior of the pan.

As shown in FIG. 4, the openings 17 are evenly distributed around the entire perimeter of the heat funnel 15 and are sized to allow heat (shown as the arrows in FIG. 4) to pass therethrough. When a heat source is located below bottom 18 of the pan 11, heat becomes incident upon the bottom plate 18 and passes up the heat funnel and through openings 17 into the interior of the pan 11. The heat funnel 15 and the openings 17 are sized and designed so that heat rising into the heat funnel and passing into the interior of the pan 11 is evenly distributed and circulated around the entire interior area of the pan. Any number and overall open area of openings 17 can be used to achieve the even distribution and circulation of heat.

The design of heat funnel 15 is such that heat rising into the interior of the pan 11 also becomes evenly distributed along the bottom surface 43 of griddle 12, thus allowing use of the griddle 12 for cooking or heating at the same time as the pan 11. Alternatively, if the cooking device 10 of the present invention is used without griddle 12, cover 13 may be placed over the opening of pan 11 and the design of heat funnel 15 allows for good circulation of heat in the interior areas of the pan 11 and cover 13.

As seen in FIGS. 1, 3 and 4, the interior of pan 11 may also have included therein a heat cone 28. The heat cone 28 is generally cylindrical in shape and of an internal diameter which is slightly greater than the external diameter of the heat funnel 15. The heat cone can be placed over the heat funnel 15 so that the bottom edge thereof contacts the bottom plate 18 of the pan 11. The heat cone is of a length which causes it to shield the entire exterior cylindrical surface of the heat funnel 15 from just below the openings 17 therein, down to the bottom 18 of the pan 11.

The heat cone functions to form an annular gap 30 between the heat funnel 15 and the interior of the pan 11. This annular gap 30 functioning to somewhat limit and shield the amount of heat which can pass from the cylindrical surface of the heat funnel 15 directly into the interior of the pan 11. This is necessary at times for certain types of cooking because the surface of the heat funnel 15 often becomes significantly hotter than the remainder of the interior of the pan 11.

A lower screen 31 (or a plurality of lower screens 31 located at different heights) can also be used in the pan 11 of the present invention in order to keep food from directly contacting bottom 18. Since bottom 18 also may be significantly hotter than the remainder of the interior of the pan 11, the lower screen 31 has generally the same function as the heat cone 28, that is, to keep food away from the hotter surfaces of the pan 11 to allow it to be evenly cooked by the even temperature of the interior of the pan 11.

Lower screen 31 includes a series of wire supporting members as are common in screens used for cooking, and further includes a central opening 33 which is sized to prevent interference with the heat funnel 15 and/or heat cone 28 when the screen 31 is placed into pan 11.

An upper screen 35 may also be located in pan 11 as shown in FIGS. 1 and 3. Upper screen 35 includes screen material 37 of conventional manufacture. Both lower screen 31 and upper screen 35 include legs (32 and 36 respectively) which contact bottom 18 of the pan 11 to hold the screens in their correct placement inside the pan 11. The legs 36 of upper screen 35 are sized to contact bottom 18 of pan 11 at the precise length where the central portion of the mesh 37 contacts the top plate 16 of heat funnel 15. The upper screen 35 is thereby located directly above the heat funnel 15 and can have food placed thereupon which will be the first direct contact made by heat passing into the pan 11 through opening 17 in the heat funnel 15.

As can be seen by one of ordinary skill in the art, the heat cone 28 and screens 31 and 35 therefore allow the cooking device 10 of the present invention to be very versatile in its adaptations and cooking applications.

The griddle 12, as best seen in FIGS. 1 and 3, includes a circular central cooking surface 42 which is formed of a generally flat circular piece of metal such as cast iron, and a rim 39 formed of a thin elongated band of metal which is bent around the perimeter of the cooking surface 42 into a cylindrical shape so as to form a lip above and below the cooking surface 42.

As is best shown in FIG. 3, the griddle 12 can be placed on the top annular edge 40a of the pan 11. The griddle 12 is sized to allow the griddle rim 39 to be slightly larger in diameter than the diameter of pan 11, thereby causing the griddle 12 to function as a cover therefor.

As shown in FIG. 4, the griddle 12, when placed over pan 11, can be substantially heated by the heat flowing up the heat funnel 15 and through the openings 17 thereof. Therefore, in this configuration, the cooking device 10 of the present invention can be used to simultaneously heat food in the interior of pan 11, and food located on surface 42 of the griddle 12. This ability, combined with the other versatile uses of the pan 11 due to the addition thereto of other concepts of the present invention, make the cooking device 10 extremely versatile in its uses.

As shown in FIGS. 1, 2 and 3, cover 13 may be included as part of the cooking device 10 of the present invention. Cover 13 is a generally circular dome-shaped cover which is sized to fit snugly onto the griddle 12. The diameter of the cover is slightly smaller than the internal diameter of the griddle rim 39.

Figure 8B:
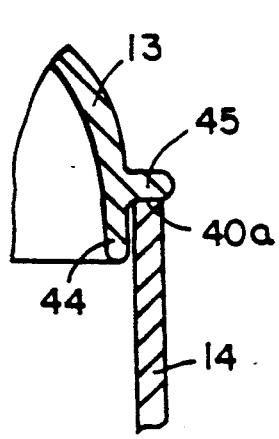
FIG. 8b is a partial cross-sectional view of the junction between the pan and cover portions of the cooking device of the present invention.
Figure 8A:
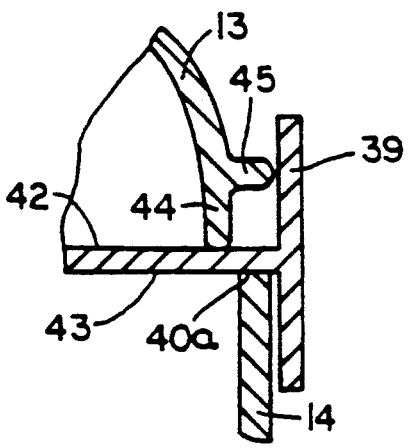
FIG. 8a is a partial cross-sectional view of the junction of the pan, griddle, and cover portions of the cooking device of the present invention.

As best seen in FIG. 8a, the cover 13 includes an end 44 of annular shape which contacts surface 42 of the griddle 12 when the cover 13 is located thereon.

If griddle 12 is not included on the pan 11, cover 13 may nevertheless be used to cover the opening of pan 11 without the presence of griddle 12. As shown in FIG. 8b, lip 45, located adjacent to end 44 of the cover 13, is also annular in shape and extends generally perpendicularly from end 44 so as to be able to contact upper annular surface 40a of pan 11. Lip 45 when in contact with surface 40a, in conjunction with end 44, effectively seals the entire perimeter of the opening of pan 11.

The cover 13 further adds to the versatility of the cooking device 10 of the present invention. With the cover 13 in place over the griddle 12, the griddle can then be used for cooking purposes than prior art griddles having no complete sealing cover cannot be used. For example, the cooking device 10 of the present invention can be used to cook food in the interior of pan 11 while heat passing from heat funnel 15 can allow the griddle to be used for cooking or warming other foods at the same time, the cover 13 functioning to seal moisture and warming heat in the area interior of the griddle 12 and cover 13.

Another important aspect of the present invention is the handles which are located on the pan 11, griddle 12 and cover 13. The handles may be uses separately or in conjunction to manipulate the cooking device 10 in the manner not possible with prior art Dutch ovens or other related cooking utensils. The handles of the present invention function to give greater stability to the cooking device when being moved thereby, which has not heretofore been accomplished by prior art designs.

Figure 9:
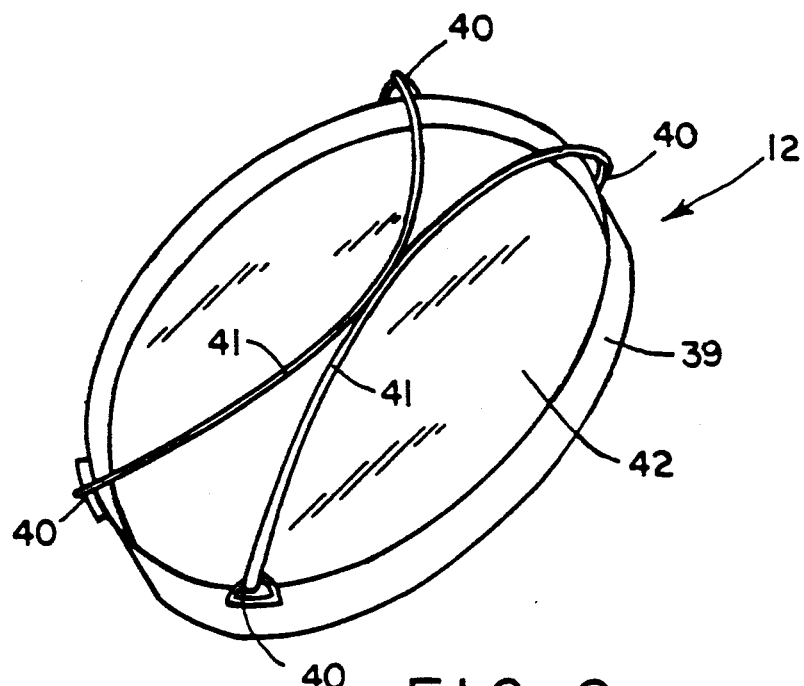
FIG. 9 is a perspective view of the griddle portion of the present invention.

As shown in FIGS. 1 and 2, pan 11 includes a handle 21 formed generally of an elongated cylindrical rod bent into an arching shape and attached to the exterior surface of housing 14 of the pan at two diametrically opposed locations. The handle 21 is hinged at its attachment points to the housing 14 and allowed to swing below the opening in pan 11 to rest against the lower portion of the housing 14 if desired. The handle 21 may be rotated to an "up" position so that it is located directly above the central portion of pan 11 and can be used to lift the pan and move it in any direction. As best seen in FIG. 1 and FIG. 9, griddle 12 includes a pair of handles 41. Each handle 41 is attached to the exterior surface of rim 39. Each handle is formed of an elongated cylindrical rod which has been bent into an arch shape. Each end of each rod has been attached to opposite sides of the griddle rim 39. The attachment point of one end of each handle is not located directly opposite the attachment point of the opposite end thereof. Instead, the attachment of each handle 41 is a mirror image of the attachment of its companion handle 41, and each attachment point of each handle 41 is located a distance away from a plane which is perpendicular to the griddle surface 42 and which passes through the center of the griddle 12 and separates the attachment points of each handle 41. In other words, each handle 41 is offset from central attachment to the griddle 12, and each handle offset is substantially a mirror image of the other.

Cover 13 includes a handle 47 which is centrally located on the apex of the exterior surface of the dome thereof.

The handles 41 and the handle 21 may be attached to their respective griddle rim 39 and housing 14 at attachment points by means of a well known type D-ring 40. Alternatively, a locking hinge 22 made according to the principles of the present invention may be used if desired.

Figure 10A:
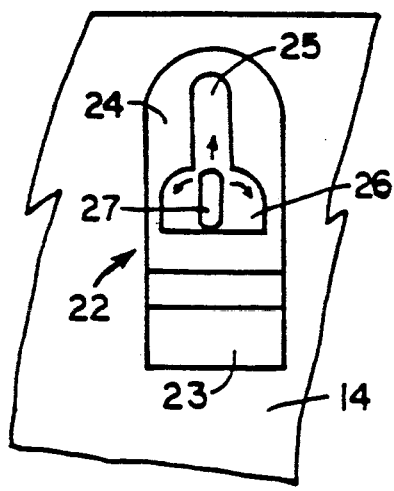
FIG. 10a is a front view of the handle attachment formed in accordance with the principles of the present invention.
Figure 10B:
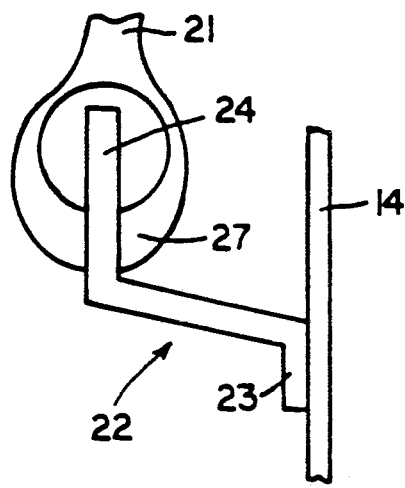
FIG. 10b is a side view of the handle attachment formed according to the principles of the present invention.

As shown in FIGS. 10a and 10b, locking hinge 22 includes attachment member 23 which attaches the hinge 22 to the exterior surface of the housing 14 (or alternatively, the griddle rim 49). Each hinge 22 further includes a locking plate 24 which has a semi-circularly shaped opening 26 in conjunction with a slot 25 formed therethrough. Each end of each handle 41 (and/or 21) includes a ring-shaped member 27 having a generally rectangular cross section. The ring-shaped member 27 passes through opening 26 and is sized to allow its rotation therein as shown in FIG. 10a. When the handle is used, the ring member 27 is rotated to a vertical position to be oriented to slide upwardly into slot 25. Once located in slot 25, ring 27 is prevented from further rotation relative to the locking member 24, and thusly prevented from rotation relative to the pan 11 or griddle 12.

When a user attempts to lift the pan 11 by handle 21 (or the griddle 12 by handles 41), the ring member 27 rotates to the generally vertical position and slides upwardly into slot 25 locking the handles in position for use. Any off-centered weighting caused by food located in the interior of pan 11 (or on griddle 12), cannot accidentally cause rotation of the pan 11 (or griddle 12) relative to the handles 21 or 41 respectively) when they are being lifted or moved about, since lifting of the handle 21 (or 41) causes it to lock into rigid position relative to the pan 11 (or griddle 12).

Alternatively, griddle 12 may include hinges of common design, such as D-ring hinges 40 which have no locking feature. Since the griddle 12 includes a pair of handles 41 located at positions spaced away from a central plane located between the handles, both handles can be used in conjunction to cause a stabilizing effect on the griddle 12. More specifically, if a user moves both handles 41 to their generally vertical position and grips both handles with one hand, the griddle 12 is prevented from further rotation relative to the handles 41. The orientation of griddle 12, and more importantly, the orientation of griddle surface 42, can then be completely controlled by the user's hand. There is no possibility of further hinging motion of the griddle 12 relative to the handles 41 when both are gripped so that the apex of each handle 41 is forced to remain adjacent the opposite handle apex.

A further added degree of stability is designed into the cooking device 10 of the present invention. As shown in FIG. 2, handles 41 and handle 21 may be used in conjunction to lift the entire cooking device 10. As can be seen, handles 41 when moved to their upward position coincide with handle 21 when it is moved to its upward position. Therefore, a user may orient handles 21 and 41 so as to be able to grip all three handles in one hand. Gripping them thusly causes them all to be fixed relative to each other which in turn causes the cooking device 10 to be prevented from any rotation relative to the handles during movement.

As shown in FIG. 3, pan 11 may also include legs 19 attached to bottom 18 thereof. Legs 19 may be located in any arrangement of spaced-apart locations in order to allow stability of the pan 11 when placed on a surface. Further, the legs 19 also allow for placement of the pan 11 into the coals of a fire or the like where the pan 11 must be held somewhat above the heat source.

The legs 19 include pads 20 which are of semi-circular shape, and as shown in FIG. 6, are oriented such that the semi-circular portion of each pad 20 is directed outwardly from the center of the bottom 18.

As shown in FIG. 5, the legs are designed to allow the cooking device 10 of the present invention to be located above an ordinary gas stove burner, the pads 20 being oriented to give the cooking device 10 the greatest stability possible without interfering with the burner.

Figure 7:
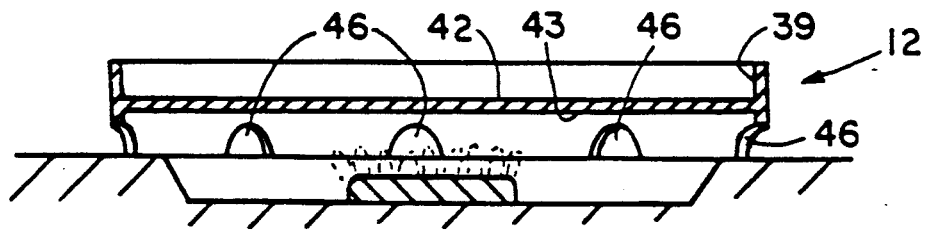
FIG. 7 is a cross-sectional view of the griddle portion of the present invention shown in place over a gas burner unit.

As shown in FIG. 7, the griddle 12 also may include openings 46 along the rim 39 thereof if desired so as to allow air to circulate to the bottom surface 43 thereof should one choose to use the griddle 12 independently of the remainder of the cooking device 10. The openings 46 would allow the griddle 12 to be placed directly over a gas burner while still allowing air to circulate as necessary.

The device 10 of the present invention is intended to be used with any type heat source such as gas, alcohol, wood, coal, charcoal, electric plate, etc.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

We claim:

1. A cooking device comprising
   a pan having a continuous, upstanding side wall and a bottom wall, with the side wall forming an enclosure about an interior of the pan;
   a top pending for the pan, said top opening being defined by the upper edge of said side wall;
   a central opening in the bottom wall of the pan;
   a tubular heat funnel having a continuous upstanding side wall, a top wall closing the top end of said heat funnel and an open bottom end attached to said bottom wall of said pan so that the opening in said bottom wall coincides with the open bottom of said heat funnel, said side wall of said heat funnel extending upwardly into the interior of the pan from the bottom wall to just below the top opening;
   a plurality of openings in the side wall of said heat funnel, with the openings being spaced around the circumference of said side wall of said heat funnel, and with the openings further being positioned closely adjacent to the top wall of said heat funnel;
   a flat griddle member positioned on the upper edge of said side wall of said pan such that the flat griddle forms a top for the interior of the pane as well as a cooking surface that is heated by heat rising through said heat funnel and then distributed uniformly about the flat griddle by the openings in the side wall of said heat funnel;
   a curved first handle having opposite ends hingedly attached to the side wall of said pan at diametrically opposite locations on the side wall of said pan, whereby said first handle can be raised to a substantially vertical position lying in a vertical plane passing through the center, vertical axis of said interior of said pan, and further wherein said first handle can be lowered to a position below the upper edge of said pan;
   a pair of curved handles having opposite ends hingedly attached to an exterior surface of said griddle, with the opposite ends of each respective pair of second handles being displaced by an equal distance away from a center line through the griddle, with one pair of second handles being displaced on one side of said center line and with the other pair of second handles being displaced on the other side of said center line; and
   said pair of curved handles are of a size and shape that when said griddle is positioned on the upper edge of said side wall and the pair of second handles are raised and rotated toward each other, the central portions of said second handles meet in an adjacent side-by-side relationship with each other and further lie in a close adjacent relationship with the central portion of said first handle when said first handle is raised to its vertical position, whereby the pan and griddle positioned on the upper edge of said side wall of said pan can be lifted and moved as a stable unit by lifting the device at a common position formed by the adjacent central portions of said pair of second handles that lie in closed adjacent relationship to the central portion of said first handle.

2. A cooking device according to claim 1 wherein said first handle includes a locking hinge means, said locking hinge means having a semi-circular opening and a slot formed therein, said slot being formed in conjunction with said semi-circular opening, a portion said first handle passing through said semi-circular opening and being rotatable relative thereto while in said semi-circular opening, said portion of said handle also being movable into said slot and being non-rotatable relative to said slot thereto while located therein.

3. A cooking device according to claim 1 further including a heat cone, said heat cone being positioned concentrically around said heat funnel, with said heat cone being sized to form an air gap between said heat funnel and said heat cone for shielding a portion of said heat funnel from said interior of said pan.

4. A cooking device according to claim 3 wherein said heat cone shields the entire area of said tubular surface of said heat funnel between said openings and said bottom of said pan.

5. A cooking device according to claim 4 further including a screen means, said screen means separating said interior of said pan into an upper and lower section, said screen means being parallel to said bottom wall of said pan, and parallel and in contact with said top wall of said heat funnel.

6. A cooking device according to claim 1 further including a lid that is generally dome-shaped, with said griddle covering said top opening of said pan and with said lid contacting a top cooking surface of said griddle.

7. A cooking device according to claim 1 wherein said first and second handles are formed from arcuately shaped elongated rod members.

8. A cooking device according to claim 1 wherein said pan further includes a plurality of leg members, each leg member having a semi-circularly shaped pad member attached thereto.

* * * * *